(12) United States Patent
Ehrlich et al.

(10) Patent No.: US 7,735,617 B2
(45) Date of Patent: Jun. 15, 2010

(54) LEVER SYSTEM FOR ACTUATING A CLUTCH

(75) Inventors: Matthias Ehrlich, Buehl (DE); Norbert Esly, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 12/313,461

(22) Filed: Nov. 20, 2008

(65) Prior Publication Data

US 2009/0078529 A1 Mar. 26, 2009

Related U.S. Application Data

(63) Continuation of application No. PCT/DE2007/000733, filed on Apr. 25, 2007.

(30) Foreign Application Priority Data

May 20, 2006 (DE) .................. 10 2006 023 806

(51) Int. Cl.
  *F16D 23/12* (2006.01)
  *F16D 65/30* (2006.01)
(52) U.S. Cl. .................. 192/84.6; 188/72.7; 188/162; 192/90; 192/99 S
(58) Field of Classification Search .................. None
  See application file for complete search history.

(56) References Cited

U.S. PATENT DOCUMENTS

| 1,816,067 | A | 7/1931 | Athimon |
|---|---|---|---|
| 5,090,262 | A | 2/1992 | Klein |
| 2004/0173429 | A1* | 9/2004 | Friedmann et al. ........ 192/99 A |

FOREIGN PATENT DOCUMENTS

| DE | 512851 | 11/1930 |
|---|---|---|
| DE | 3718944 A1 | 12/1988 |
| DE | 19517666 A1 | 11/1995 |
| DE | 19723394 A1 | 12/1997 |
| DE | 10312207 A1 | 10/2003 |
| DE | 102004009832 A1 | 9/2004 |
| GB | 14756 | 0/1913 |
| GB | 2 313 885 A * | 12/1997 |
| WO | WO90/14979 | 12/1990 |

* cited by examiner

*Primary Examiner*—Rodney H Bonck
(74) *Attorney, Agent, or Firm*—Simpson & Simpson, PLLC

(57) ABSTRACT

A lever system for actuating a clutch in the power train of a motor vehicle or of a disc brake, including: a lever (7) with a first side (7.1) rotatably supported on a pivot (8) and with a side (7.2) in functional connection with a pressing means (6). The lever (7) rests on a movable fulcrum (12) provided by a moveable support unit (10) that is displaceable in radial direction relative to the rotation axis of the clutch or the disc brake and which is displaceable using a motor-driven (15) spindle (14. The moveable support unit (10) rests on a raceway (11) and includes two roller sets (20.1, 20.2) each with rollers (21, 22, 22.1, 22.2). Each of the roller set (20.1, 20.2) includes at least three rollers (21, 22, 22.1, 22.2) and at least two of the rollers (22.1, 22.2) include approximately equal first diameters.

12 Claims, 5 Drawing Sheets

US 7,735,617 B2

LEVER SYSTEM FOR ACTUATING A CLUTCH

CROSS REFERENCE TO RELATED APPLICATIONS

This application is filed under 35 U.S.C. §120 and §365(c) as a continuation of International Patent Application PCT/DE2007/000733, filed Apr. 25, 2007, which said application claims priority from German Patent Application No. 10 2006 023 806.0, filed May 20, 2006, which applications are incorporated herein by reference in their entirety.

FIELD OF THE INVENTION

The present invention relates to a lever system for actuating a clutch, for example, a clutch in the power train of a motor vehicle or a brake, in particular a disc brake including a lever that is rotatably supported on one side about a pivot and the other side is in functional connection with a pressing means. The lever rests on a fulcrum on a runner unit that is displaceable in the radial direction by means of a motor-driven spindle and the runner unit rests on a raceway fixed to the housing and includes at least one roller set with runners.

BACKGROUND OF THE INVENTION

A generic clutch release system is known from the DE 10 2004 009832 document. FIG. 2 and FIG. 3, explained further below, show an exemplary embodiment of a lever system according to prior art.

In solutions based on prior art, the introduction of torque to the axles or to the mounting points of roller set axles in a hub is disadvantageous.

BRIEF SUMMARY OF THE INVENTION

The object of the present invention is to provide a lever system in which only small torque is introduced to the fixing point of roller set axles in a hub.

This object is met by means of a lever system for actuating a clutch, for example, a clutch in the power train of a motor vehicle or of a brake, in particular a disc brake comprising a lever, one side of which is rotatably supported about a pivot and the other side of which is in functional connection with a pressing means. The lever rests with one fulcrum on a runner unit displaceable in the radial direction and displaceable by means of a motor-driven spindle. The runner unit rests on a raceway fixed to the housing and at least includes a roller set with runners. The roller set comprises at least three runners, of which at least two runners feature a first diameter substantially equal and at least one runner that features a second diameter that differs from the first diameter. The terms first and second diameter are only chosen to distinguish between the two different diameters; which one of the two diameters is greater or smaller is not clarified by the terms first diameter and second diameter. Preferably, runners are disposed with approximately equal diameters on both sides of the runner with deviant diameter. Thus, runners with the first diameter rest on the lever and runners with the second diameter rest on the raceway. Preferably, runners with the first diameter rest on the lever and runners with the second diameter rest on the raceway. In that case, the first diameter can be the larger diameter and the second diameter the smaller diameter; the assignment can also be reversed. The roller set preferably comprises three runners. The two runners with approximately equal first diameter have a smaller diameter than the third runner. The preceding runner arrangement can also be reversed in principle, thus, it can be provided also that the roller set comprises three runners and the two runners with approximately equal first diameters have a larger diameter than the third runner. In one embodiment, the two runners with approximately equal diameters rest on the raceway and runners with the larger diameter rest on the lever. Preferably, the runners with the larger diameter engage with a section of the raceway. Owing to the engagement of the runner in the section, lateral guidance of the runner and thus of the roller set or of the entire runner unit is effectuated. In one embodiment, the two runners with approximately equal diameters comprise discs that project radially beyond runners and engage with the section of the raceway. The discs likewise bring about lateral guidance, in this case, a lateral guidance of the two runners with the smaller diameter. In one embodiment of the lever system according to the invention, the roller sets respectively rest loosely on an assigned idler roller that is disposed on an idler roller axle connected with the hub. The idler rollers bear the forces acting tangentially to the raceway; and the roller sets bear the forces acting in the normal direction to the raceway or in the normal direction to the lever. Advantageously, the normal forces do not generate torque on an axle of the roller sets. In one embodiment of the lever system according to the invention, the idler roller axle assigned to a roller set is connected with the respective axle of the roller set such that radial displacement of either towards one another is not possible. This connection can be executed, for instance, in the form of a cage that connects the respective idler roller axle with the respective axle. This arrangement corresponds functionally with a rod that connects the two axles with one another, where the two axles are mounted in a rotatable manner relative to the rod.

The problem mentioned above is solved by means of a runner unit for a lever system for actuating a clutch, for example, a clutch in the power train of a motor vehicle or of a brake, in particular a disc brake. The lever system comprises a lever that on one side is mounted rotatably about a pivot. The lever rests with one fulcrum on a runner unit displaceable in radial direction and displaceable by means of a motor-driven spindle. The runner unit rests on a raceway fixed to the housing and includes at least one roller set with runners. The roller set includes at least three runners, of which at least two runners feature approximately equal first diameters and at least one runner features a second diameter that is deviant from the first diameter. The problem mentioned above is also solved by means of a clutch release system for a clutch in the power train of a motor vehicle with a lever system according to the invention as well as a motor vehicle with a clutch release system for a clutch comprising a lever system according to the invention.

BRIEF DESCRIPTION OF THE SEVERAL VIEWS OF THE DRAWING

Exemplary embodiments of the invention are explained in the following passage, based on the attached drawings. The figures are as follows.

DETAILED DESCRIPTION OF THE PREFERRED EMBODIMENT

Figure 1:
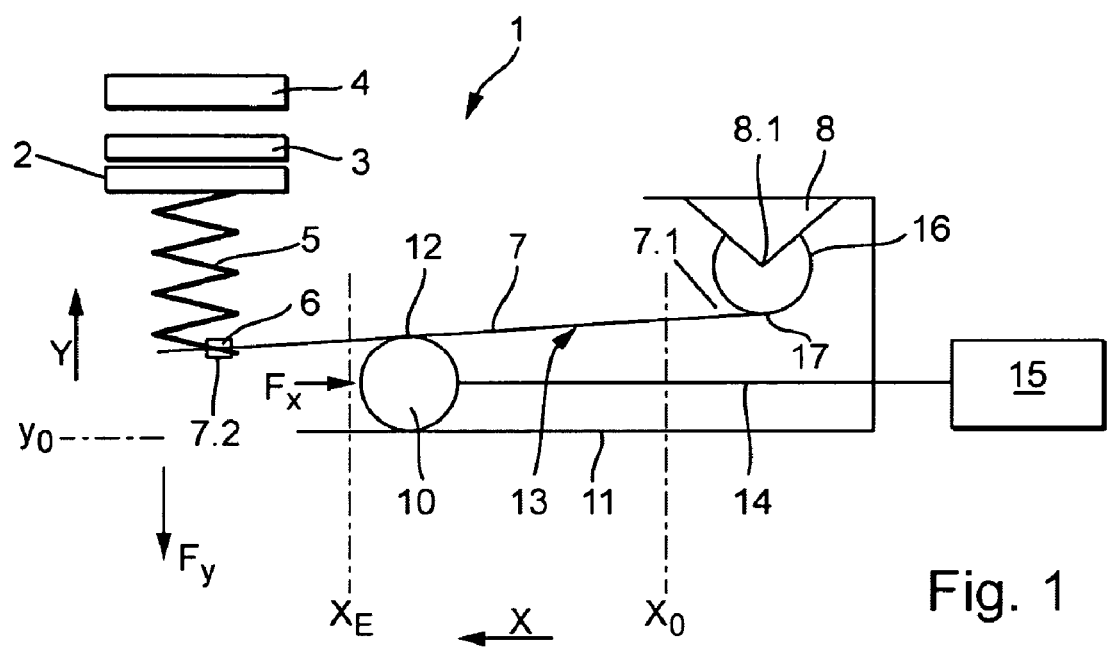
FIG. 1 is a schematic depiction of a lever system according to the invention.

FIG. 1 shows a sketch of a disengagement system for actuating a clutch in the power train of a motor vehicle, between the engine and manual transmission. The principle of such a disengagement system is known from DE 10 2004 009832. Schematically depicted in FIG. 1 is a clutch 1 with a pressure plate 2 as well as a clutch disc 3 and a counterpressure plate 4. To engage the clutch, pressure plate 2 on counterpressure plate 4, non-rotationally connected with a crankshaft (not depicted), is pressed so that clutch disc 3 interposed between pressure plate 2 and counterpressure plate 4 is non-rotationally and non-positively connected with a transmission input shaft (not depicted). Pressure plate 2 is connected with a disc spring 5, which is depicted only schematically as a spring. Disc spring 5 is connected with a lever 7 via a pressing means 6. Pressing means 6 ensures that disc spring 5 is rotatably mounted in a known manner about a clutch axis 9—the clutch axis 9 is the rotation axis—about which the clutch rotates in operation, which in normal cases coincides with the axis of transmission input shaft as well as the crankshaft axis. Thus, in as far as the arrangement corresponds to the arrangement described to date in DE 10 2004 009832 based on the example depicted in FIG. 1 and FIG. 2 for actuating a clutch. Lever 7 is mounted on the one side 7.1 of the lever with a housing bearing 8 capable of swiveling about an axis 8.1 that projects from the drawing plane of FIG. 1; on the other side 7.2, it is connected with pressing means 6. The housing bearing comprises a circular segment disc 16, on which lever 7 is disposed so that fastening point 17 of the lever on circular segment disc 16 during rotation of the lever about axis 8.1 moves on a circular track. The connection between lever 7 and pressing means 6 can be formed such that radial displacement can occur based on clutch axis 9. The radial displacement is necessary for compensation of a radial relative motion of lever 7 opposite to pressing means 6 during actuation of lever 7. Lever 7 rests on a runner unit 10 that, as depicted in FIG. 1 of DE 10 2004 009832, for instance, consists of an arrangement of rollers which can be disposed in form of a triangle, wherein one of the rollers is in contact with lever 7 and the two other rollers rest on one essentially plane raceway 11. In one embodiment, the raceway is fixed to a housing (not shown). For simplicity, runner unit 10 is depicted here as a circle. Runner unit 10 rests on lever 7 in a displaceable fulcrum 12. Fulcrum 12 is displaced during displacement of runner unit 10 along a curved track 13. Curved track 13 is formed by the side of lever 7 facing the runner unit 10. Lever 7 in this respect, according to the sketch of FIG. 1, can be a rod or a disc with essentially constant thickness, however, it can likewise feature another arbitrary form, so that, for instance, curved track 13 features a form different from the side of lever 7 facing away from runner unit 10. Runner unit 10 is displaceable via a spindle 14 by means of an electric motor 15, rigidly mounted on the housing, in a radially displaceable manner relative to clutch axis 9 along the coordinate x. If runner unit 10 is displaced along the raceway 11, in one of the two directions specified by coordinate x, then the axial point of pressing means 6 changes (based on clutch axis 9). For the axial point of pressing means 6, a coordinate y is drawn in FIG. 1; for the radial point of runner unit 10, coordinate x is drawn accordingly. Zero points of both coordinates are first arbitrary; for coordinate x, the radially furthest, outwardly displaced point of rest point 12 of runner unit 10 can be assumed as zero point, for instance. This point is outlined in FIG. 1 by means of a dashed line with designation $x_o$. A point $y_o$ of pressing means 6 belongs to point $x_o$ of runner unit 10 or of rest point 12. Should value x and hence the point of runner unit 10 be increased from value $x_o$ in the direction of coordinate x, then pressing means 6, starting from the direction of the coordinate, will be moved from a zero point $y_o$, at the same time, pressure plate 2 will be moved towards counterpressure plate 4, thus, the clutch will be connected. Point $x_o$ of runner unit 10 in the present exemplary embodiment designates the disconnected point of the clutch. This therefore involves an actively pressed clutch. In principle, it is also possible in the same manner to operate a clutch to be disconnected actively, when it is connected at rest and is not yet disconnected.

Figure 2:
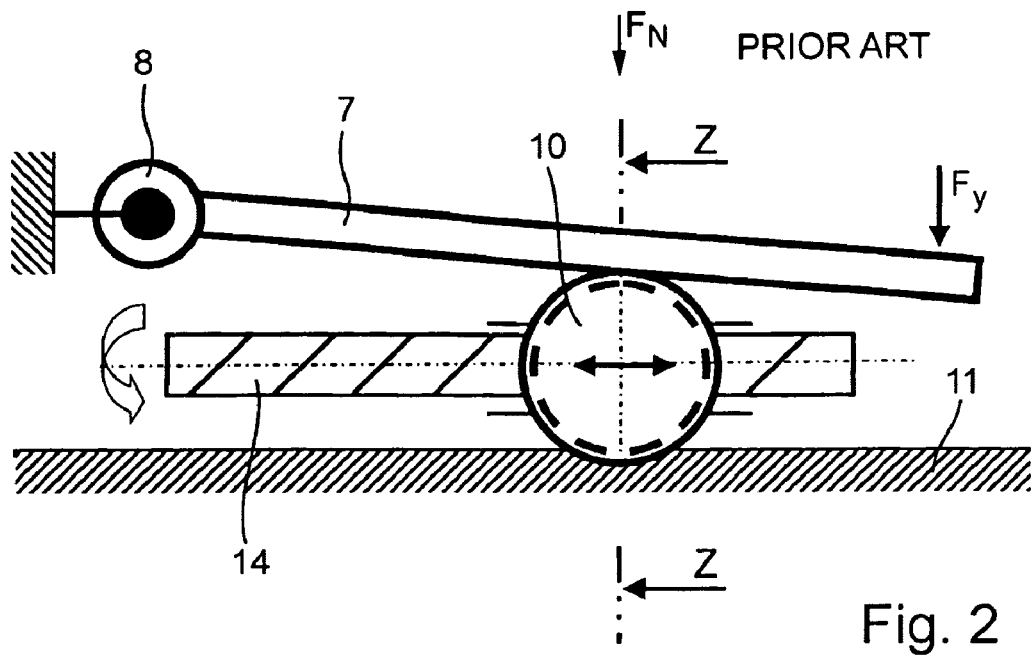
FIG. 2 is a side-view of a prior art runner unit.
Figure 3:
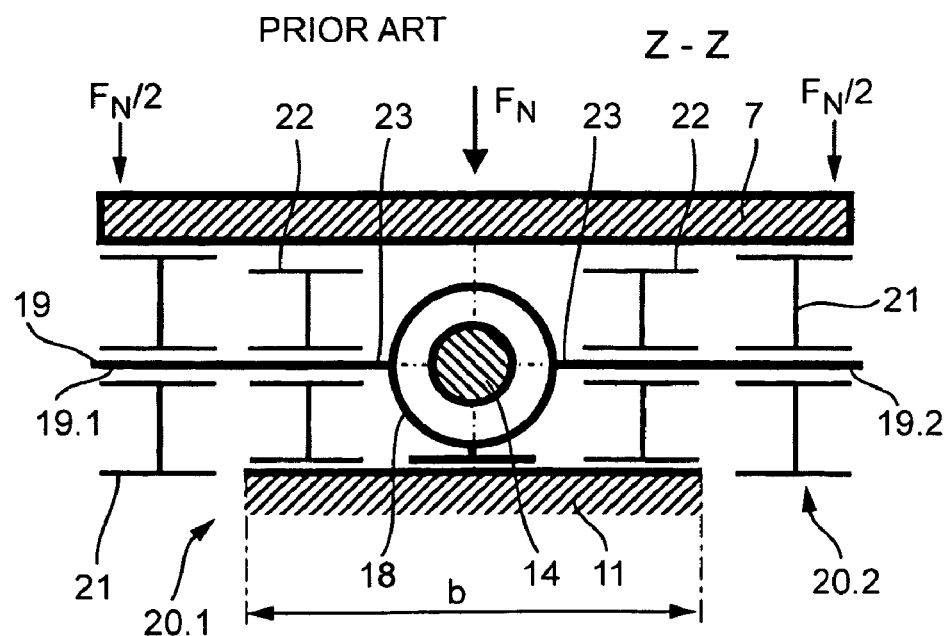
FIG. 3 is a cross-sectional view along Section Z-Z in FIG. 2.

FIG. 2 and FIG. 3 show a principle sketch of a disengagement system according to the prior art in FIG. 1 in further abstracted depiction. Lever 7 is rotatably mounted with housing bearing 8. Runner unit 10 is connected with spindle 14 by means of a mount hub 18. Mount hub 18 comprises an axis 19, which, as is apparent in the depiction of FIG. 3, comprises two axles 19.1 and 19.2 disposed on both sides of mount hub 18 and for instance screwed or welded together with said axles. Roller sets 20.1 or 20.2 are respectively disposed on axles 19.1 and 19.2. Roller sets 20.1 and 20.2 respectively comprise a runner with large diameter 21 and a runner with small diameter 22. The runner with large diameter 21 rests on lever 7, runner 22 with small diameter rest on raceway 11. Raceway 11 has a width b, which is dimensioned such that it is wrapped around by runners with larger diameter 21 of roller sets 20.1 and 20.2. The runners with larger diameter 21 wrap around raceway 11 and thus provide lateral guidance of roller sets 20.1 and 20.2 and thus of the entire runner unit 10. Lever 7 rests respectively on runners 21, the entire runner unit 10 rests on raceway 11 via runners with smaller diameter 22. Clutch force Fy causes a corresponding normal force $F_N$ in fulcrum 12 through the lever arm ratios between fulcrum 12 and the action of clutch force Fy or of the lever between fulcrum 12 and fastening point 17. Assuming symmetrical geometrical dimensions, $F_N/2$ acts respectively on runners with large diameter 21 and the corresponding counteractive force of $F_N/2$ on runners with small diameter 22. Thus, torque is generated about fastening points 23 of axles 19.1 and 19.2 with mount hub 18.

Figure 4:
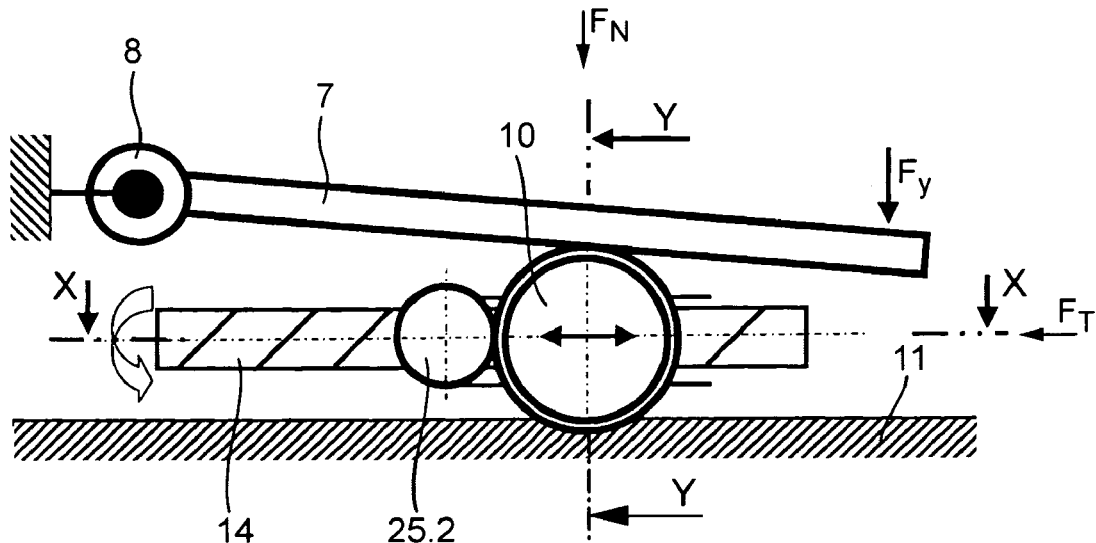
FIG. 4 is side view of a first exemplary embodiment of a runner unit according to the invention.
Figure 5:
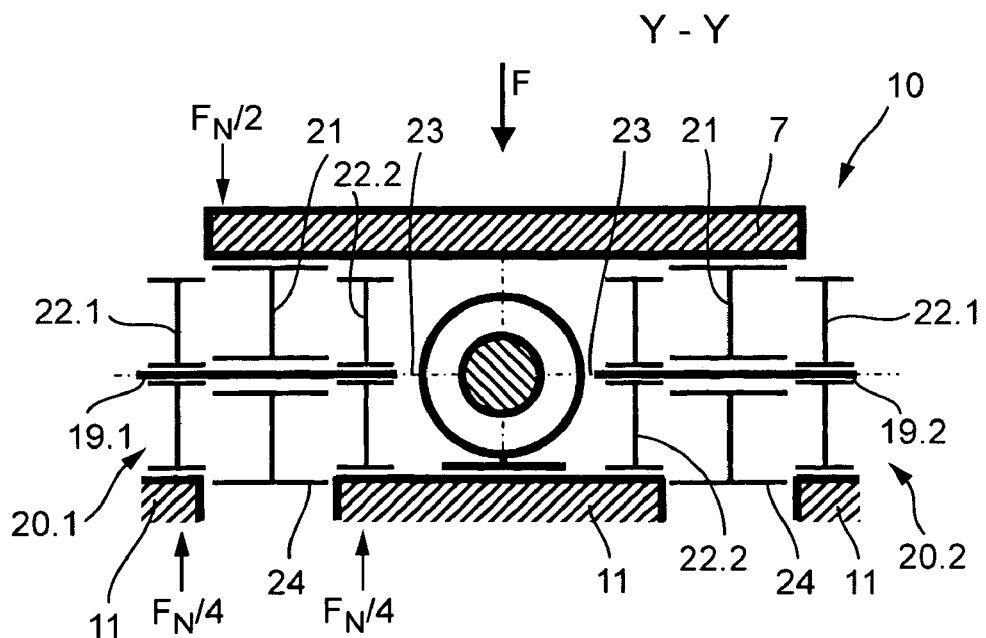
FIG. 5 is a cross-sectional view along Y-Y in FIG. 4.
Figure 6:
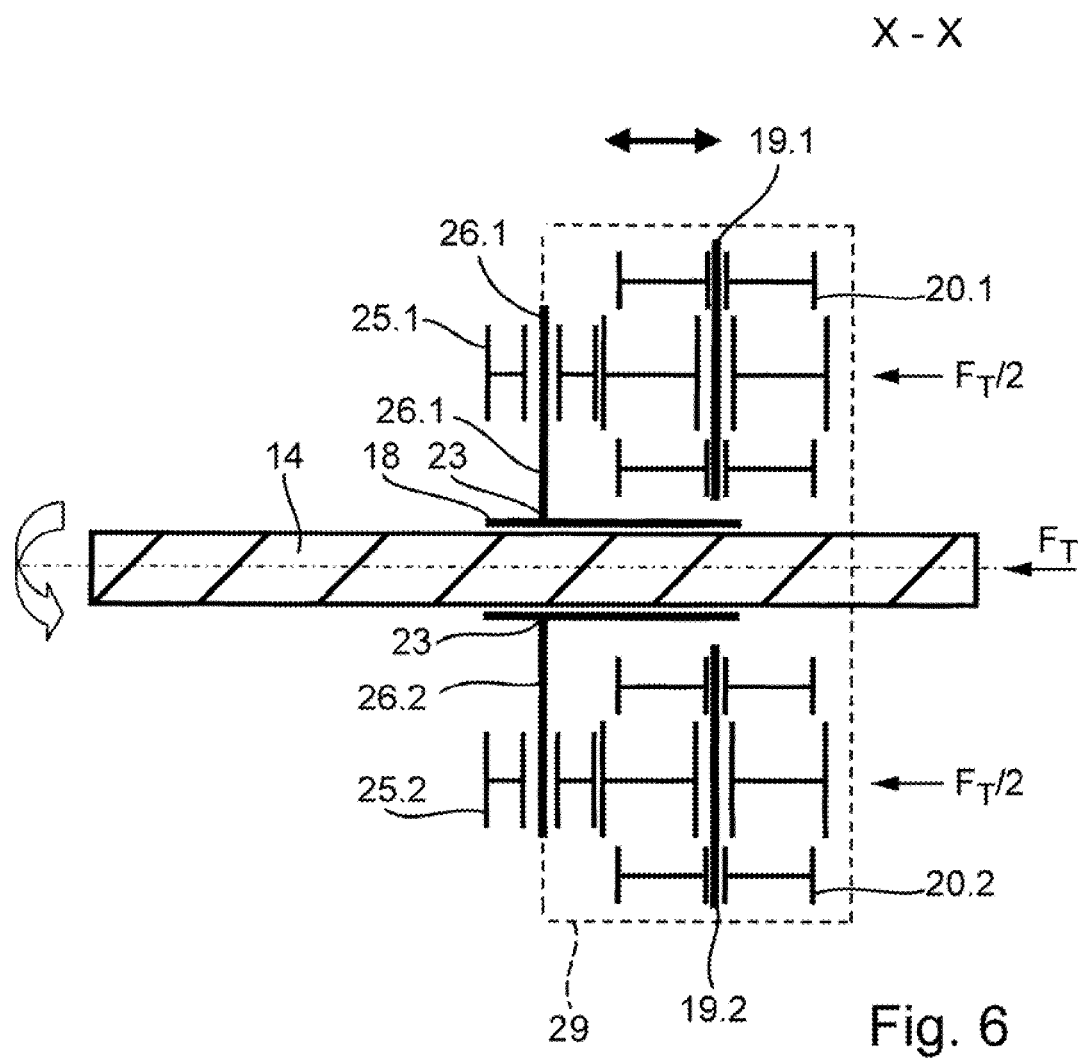
FIG. 6 is an exemplary embodiment of a runners assembly according to FIGS. 4 and 5.

FIGS. 4 to 6 show an exemplary embodiment of a lever system according to the invention or a runner unit 10 according to the invention. On the housing side, lever 7 rests on a housing bearing 8. Runner unit 10 is moved by a spindle 14 and rests on a raceway 11. The type of depiction otherwise corresponds essentially to the depiction of FIG. 2.

FIG. 5 shows a section according to Y-Y in FIG. 4. Runner unit 10 comprises two roller sets 20.1 and 20.2 that rest on idler rollers 25.1 and 25.2, which are connected with idler roller axles 26.1 and 26.2 with mount hub 18. Roller sets 20.1 and 20.2 are therefore not directly connected with mount hub 18 and comprise respectively a runner with large diameter 21, which rest on lever 7. A runner with small diameter 22.1 and 22.2 is disposed respectively on both sides of runners with large diameter 21. In FIG. 5 is the runner with small diameter, which is disposed between the respective runners with large diameter 21 and mount hub 18, is provided with reference sign 22.2; the runner with small diameter, which is disposed on the runner with large diameter 21 facing away from mount hub 18, is provided with reference sign 22.1. The runners with small diameter 22.1 and 22.2 respectively rest on raceway 11.

Raceway 11 includes two cutouts 24, which as depicted in FIG. 5 run perpendicularly to the drawing plane. The runners with large diameter 21 of two rollers sets 20.1 and 20.2 will engage with cutouts 24. When a force $F_N/2$ is exerted as compressive force by lever 7 on one of runners with large diameter 21, then a counteractive force $F_N/4$ will be exerted by the two respectively assigned runners 22.1 and 22.2 of respective roller set 20.1 or 20.2. This is depicted in the example of roller set 20.1 in FIG. 5. Apart from a deflection of axles 19.1 or 19.2, on which the respective roller sets 20.1 or 20.2 are connected with mount hub 18, no torque will be exerted by the normal force $F_N$ arising from clutch force Fy on fastening points 23. Cutouts 24 in raceway 11 provide a two-side guidance of roller sets 20.1 or 20.2, since runners with large diameter 21 respectively engage with same, so that the runner with large diameter 21 partially projects into section 24 as is apparent in FIG. 5.

FIG. 6 shows a section according to X-X in FIG. 4. Roller sets 20.1 and 20.2 do not rest directly on mount hub 18, but support themselves on idler rollers 25.1 and 25.2, which are connected by idler roller axles 26.1 and 26.2 with mount hub 18. Axles 19.1 and 19.2 are therefore not connected directly with mount hub 18. Through the geometry of lever configuration, a clutch force Fy, a normal force $F_N$, and a tangential force $F_T$, as they are marked in FIG. 4, are constantly exerted on runner unit 10. Force $F_T$ is also outlined in FIG. 6. Through tangential force $F_T$, roller sets 20.1 and 20.2, on which tangential force $F_T$ respectively act on the parts, are pressed against idler rollers 25.1 25.2. In addition (not shown), axle 19.1, for instance, can be connected with support axle 26.1 and axle 19.2 as well with support axle 26.2, e.g., in form of a cage 29. Half-tangential force $F_T/2$ acts on either idler roller 25.1 or 25.2 respectively—when disposed symmetrically on spindle 14. The preceding arrangement produces the only torque in fastening points 23.

Runners with small diameter 22.1 and 22.2 and axis 19 on which they are located and axle 19.1 for roller set 20.1 and axle 19.2 for roller set 20.2 can be connected firmly, e.g., by either pressing or welding. The runner with large diameter 21 of respective roller set 20.1 or 20.2 is rotatably supported relative to respective axle 19.1 or 19.2, so that runners with small diameter 22.1 and 22.2 are not rotatable about their own respective axis. However, the runners with small diameter 22.1 and 22.2 are rotatable relative to the runner with large diameter 21 of the respective roller set 20.1 or 20.2. In principle, this arrangement can also be reversed, in that, the respective axle is firmly connected with the runner with large diameter 21 and runners with small diameter 22.1 and 22.2 are rotatably disposed relative to the axle.

Figure 7:
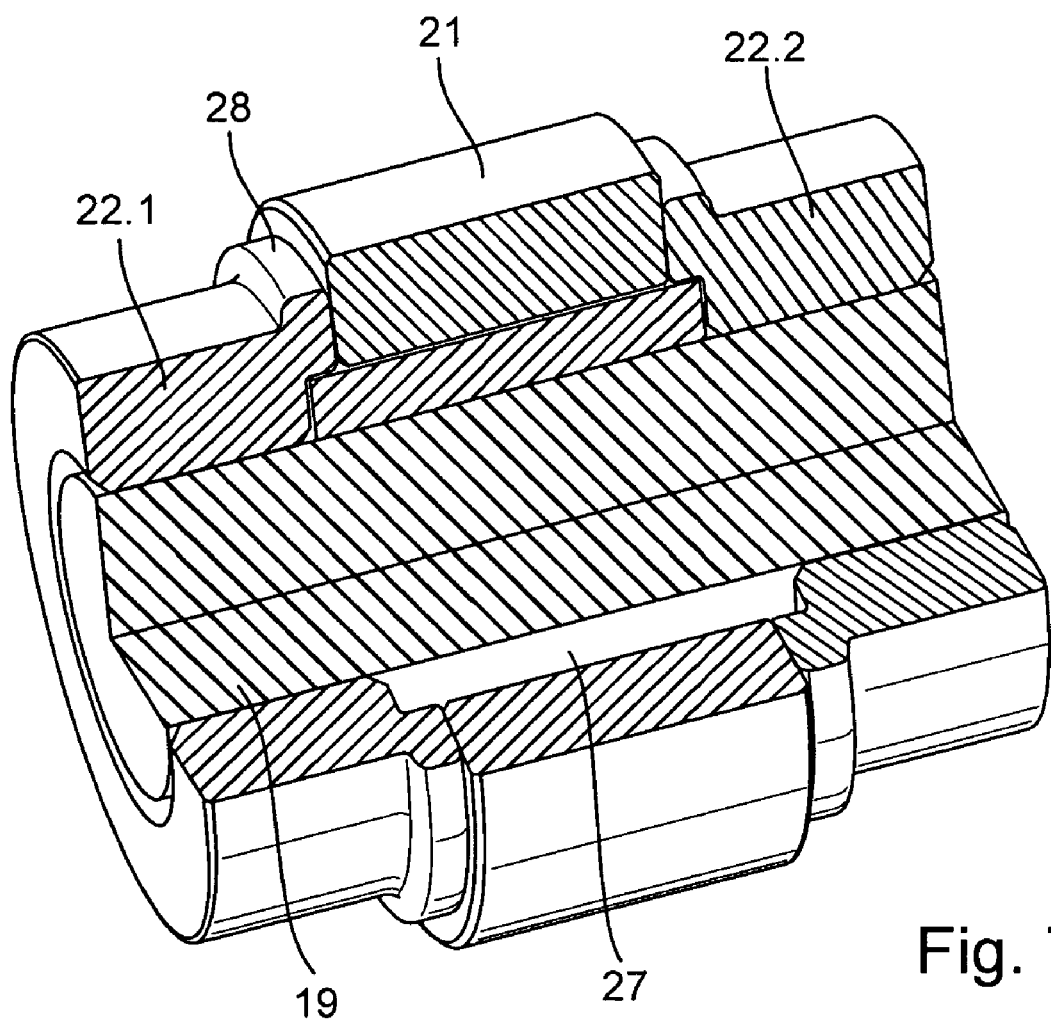
FIG. 7 is a partial-sectional perspective view of an exemplary embodiment of a roller set.

FIG. 7 shows an exemplary embodiment of a roller set 20.1 or 20.2 in a three-dimensional depiction, in partial section. Axis 19 is pressed together with runners with small diameter 22.1 and 22.2. A needle bearing 27 is disposed between runners with small diameter 22.1 and 22.2, which carry the runner with large diameter 21. In the exemplary embodiment of FIG. 7, runners with small diameter 22 comprise discs 28 respectively on the side facing the runner with large diameter 21, which engage with cutouts 24 and take over lateral guidance of the respective roller set 20.1 or 20.2.

REFERENCE SIGN LIST 1 clutch
2 pressure plate
3 clutch disc
4 counterpressure plate
5 disc spring
6 pressing means
7 lever
7.1, 7.2 side of the lever
8 housing bearing
9 clutch axis
10 runner unit
11 raceway
12 fulcrum
13 curved track
14 spindle
15 electric motor
16 circular segment disc
17 fastening point
18 mount hub
19 axis
19.1, 19.2 axles
20.1, 20.2 roller sets
21 runner with large diameter
22, 22.1, 22.2 runner with small diameter
23 fastening point
24 section
25.1, 25.2 idler rollers
26.1, 26.2 idler roller axles
27 needle bearing
28 discs
29 roller cage
X actuation distance of actuator
Y actuation distance of clutch
Fy clutch force
Fx actuating force
$F_N$ normal force
$F_T$ tangential force

What we claim is:

1. A lever system for actuating a clutch in the power train of a motor vehicle or for actuating a disc brake, comprising: a lever (7) with a first side (7.1) rotatably supported on a pivot (8) and with a side (7.2) in functional connection with a pressing means (6), wherein said lever (7) rests on a movable fulcrum (12) provided by a moveable support unit (10) that is displaceable in radial direction relative to the rotation axis of the clutch or the disc brake and which is displaceable by means of a motor-driven (15) spindle (14), wherein said moveable support unit (10) rests on a raceway (11) and comprises a first roller set (20.1) and a second roller set (20.2), wherein each of the first and second roller sets (20.1, 20.2) includes at least first, second, and third rollers (21, 22, 22.1, 22.2), wherein said first and second rollers (22.1, 22.2) include approximately equal first diameters and wherein said third roller (21) includes a second diameter that is deviant from said first diameter, the lever system further comprising first and second idler rollers (25.1, 25.2), first and second idler roller axles (26.1, 26.2), and mount hub (18), wherein said first and second roller sets (20.1, 20.2) respectively rest loosely on a corresponding idler roller from said first and second idler rollers (25.1, 25.2), which is disposed on an idler roller axle from said first and second idler roller axles (26.1, 26.2) which is connected with said mount hub (18).

2. The lever system according to claim 1, wherein said at least two of said first and second rollers (22.1, 22.2) with approximately equal diameters are disposed on opposite sides of said at least one third roller (21) with said deviant diameter.

3. The lever system according to claim 2, wherein said at least two of said first and second rollers (22.1, 22.2) with the first diameter rest on said lever (7) and said at least one third roller (21) with the second diameter rests on said raceway (11).

4. The lever system according to claim 2, wherein the second diameter is larger than the first diameter, wherein said at least one third roller (21) with the second diameter rests on said lever (7) and said at least two of said first and second rollers (22.1, 22.2) with the first diameter rest on said raceway (11).

5. The lever system according to claim 1, wherein each of said first and second roller sets (20.1, 20.2) comprises the first, second, and third rollers (21, 22.1, 22.2) wherein the first and second rollers (22.1, 22.2) have an approximately equal first diameter and the third roller has the second diameter, wherein the first diameter is smaller than the second diameter.

6. The lever system according to claim 5, wherein the at least two of said first and second rollers (22.1, 22.2) with approximately equal first diameters rest on said raceway (11) and wherein said at least one third roller (21) with the second diameter rests on said lever (7).

7. The lever system according to claim 6, wherein said raceway (11) comprises a section (24) and wherein said at least one third roller (21) with the second diameter engages with said section (24) of said raceway (11).

8. The lever system according to claim 7, wherein the first and second rollers (22.1, 22.2) further comprise respective discs (28) that engage with said section (24) of said raceway (11).

9. The lever system according to claim 1, wherein the first and second roller sets (20.1, 20.2) comprise respective first and second axles (19.1, 19.2) and wherein said respective first or second idler roller axle (26.1, 26.2) assigned to a respective first or second roller set (20.1, 20.2) is connected with the respective first or second axle (19.1, 19.2) of said roller set such that no radial displacement of either is possible relative to one another.

10. A clutch release system for a clutch in the power train of a motor vehicle with a lever system according to claim 1.

11. A motor vehicle with a clutch release system for a clutch comprising a lever system according to claim 1.

12. A movable support unit for a lever systems for actuating a clutch in the power train of a motor vehicle or for actuating a disc brake, wherein the lever system comprises a lever (7) with a first side (7.1) rotatably supported on a pivot (8) and with a second side (7.2) in functional connection with a pressing means (6), wherein the lever (7) rests on a fulcrum (12) provided by the movable support unit (10) displaceable in radial direction relative to a rotation axis of the clutch or the disc brake by means of a motor-driven (15) spindle (14), wherein the movable support unit (10) rests on a raceway (11) and comprises a first roller set (20.1) and a second roller set (20.2), wherein each said first or second roller set comprises at least first, second, and third rollers, wherein the first and second rollers of said at least first, second, and third runners include approximately equal first diameters and wherein the third roller of said at least first, second, and third rollers includes a second diameter deviant from the first diameter, the lever system further comprising first and second idler rollers (25.1, 25.2), first and second idler roller axles (26.1, 26.2), and mount hub (18), wherein said first and second roller sets (20.1, 20.2) respectively rest loosely on a corresponding idler roller from said first and second idler rollers (25.1, 25.2), which is disposed on an idler roller axle from said first and second idler roller axles (26.1, 26.2) which is connected with said mount hub (18).

* * * * *